A. EDWARDS.
RECEPTACLE FOR REFUSE AND THE LIKE.
APPLICATION FILED DEC. 15, 1914.

1,167,055.                                  Patented Jan. 4, 1916.

WITNESSES
Geo. A. Simon
Annie Duffy

INVENTOR:
Albert Edwards
BY
Edmond Congar Brown
ATTORNEY

UNITED STATES PATENT OFFICE.

ALBERT EDWARDS, OF NEW YORK, N. Y., ASSIGNOR, BY DIRECT AND MESNE ASSIGNMENTS, OF ONE-HALF TO REGINALD C. TUFFIN AND ONE-HALF TO JAMES J. McDERMOTT, JR.

RECEPTACLE FOR REFUSE AND THE LIKE.

1,167,055.     Specification of Letters Patent.     Patented Jan. 4, 1916.

Application filed December 15, 1914. Serial No. 877,347.

*To all whom it may concern:*

Be it known that I, ALBERT EDWARDS, a citizen of the United States, and a resident of the borough of Brooklyn, in the city and State of New York, have invented certain new and useful Improvements in Receptacles for Refuse and the like, of which the following is a specification.

The invention relates to receptacles, and more particularly to receptacles which are adapted to contain refuse and the like, and has for its object to produce such a receptacle which shall be provided with a dust and odor proof automatically acting cover.

The invention consists in the novel construction, arrangement and combination of various devices, elements and parts, as shown in the accompanying drawings, and hereinafter more particularly described.

Figure 1:
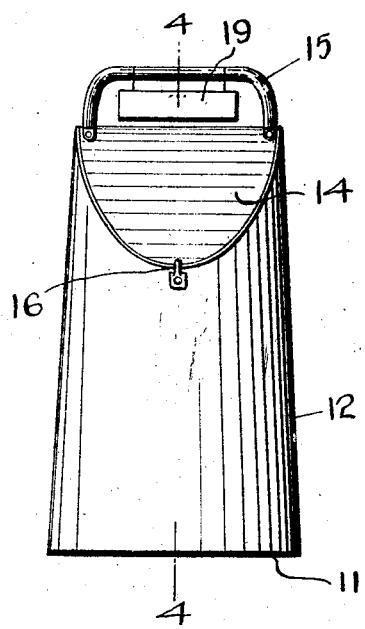
Figure 2:
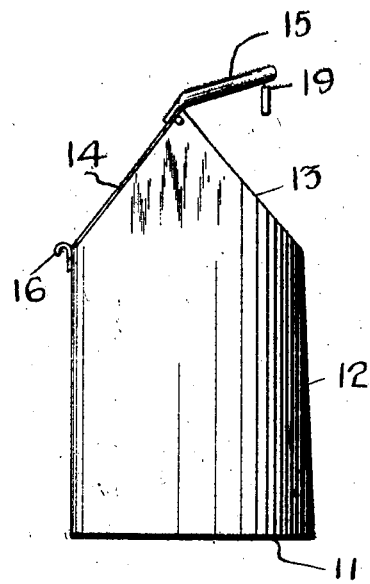
Figure 3:
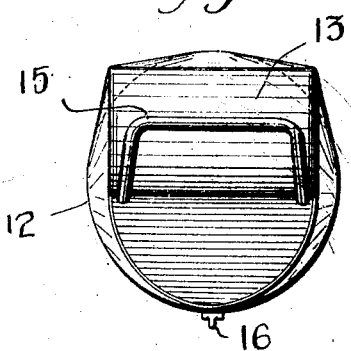
Figure 4:
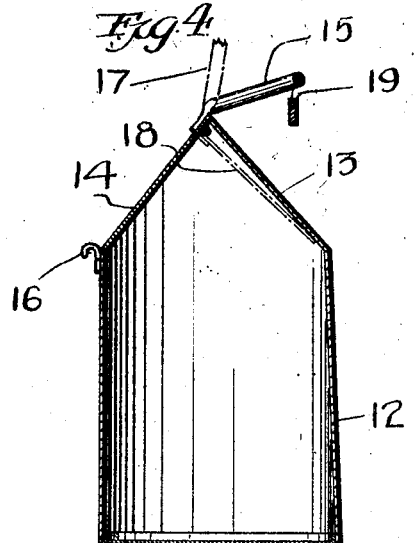

In the said drawings, Figure 1 is a front view of my invention, Fig. 2 is a side view of the same; Fig. 3 is a top view; and Fig. 4 is a section taken on the line 4—4 of Fig. 1.

In carrying my invention into effect in the embodiment thereof which I have selected for illustration in the accompanying drawings and description in this specification, I provide a refuse can comprising a bottom portion 11 and a body portion 12. The can shown in the drawing is round, although it is obvious that any other shape may be used if desired.

The top portion of the receptacle comprises a plane surface 13 and an opening covered by a lid 14. This lid 14 is hinged to the receptacle near the upper part of the plane surface 13, in such a manner as to enable it to swing inward. Rigidly secured to the lid 14 is a handle 15, which may be provided if desired with a weight 19, the handle and weight combined being of sufficient weight to act as a counterbalance as hereinafter described. The receptacle may also be provided, if desired, with a hook 16, the use of which is hereinafter described.

The operation of my invention is as follows: If the lid 14 were not provided with the handle 15, or with the weight 19, it would tend to hang vertically from the upper side of the plane surface 13, but being so provided, the weight of the said handle 15 (and the weight 19, if the same is used) causes the cover 14 to swing toward the front of the receptacle and tightly close the opening therein. When it is desired to place anything in the receptacle, it is very easy to pull the handle forward, moving the cover inward, and uncovering the opening. If the object is of any considerable size, it may even be merely dropped or thrown upon the cover, which will automatically open to admit it, and close after it.

When it is desired to empty the receptacle, it is only necessary to turn it over to a certain extent, the handle being held forward, until the center of gravity of the counter-weight handle will fall in front of the point at which the cover is hinged, and the handle will therefore assume the position shown in Fig. 4 by the dotted lines and designated 17. The cover is thereby held backward in the position shown in Fig. 4 by the dotted lines and designated 18, thus leaving the opening entirely free for the emptying of the contents. As soon as the receptacle is placed right side up, the cover automatically closes. When it is desired to empty the contents into a refuse wagon, the hook 16 may engage with the side of the wagon, thus preventing the receptacle from slipping. If the receptacle is only partly full, it is unnecessary to hold the hand forward, as if the receptacle is tilted sufficiently the closure will open of its own accord. If the receptacle is nearly full, however, it may sometimes be necessary that the closure be opened before the receptacle is tilted too far, otherwise the contents would fall against the closure and prevent its opening.

One of the principal advantages of my invention lies in the automatically acting cover, which prevents dust and odors from escaping from the receptacle.

Having thus described my invention what I claim as new and desire to secure by Letters Patent is as follows:

1. In a receptacle for refuse and the like adapted to be tilted to empty the same, the combination with a body portion, of an inwardly opening closure pivotally secured to said body portion, and a counterweight rigidly secured to said closure above its pivotal point, said counterweight being adapted when said receptacle is held in one position to hold said closure in its closed position, and when said receptacle is held in another position to hold said closure in its open position.

2. In a receptacle for refuse and the like adapted to be tilted to empty the same, the combination with a body portion, of an inwardly opening closure pivotally secured to said body portion, and a counterweight rigidly secured to said closure above its pivotal point, said counterweight being provided with a hanging weight and being adapted when said receptacle is held in one position to hold said closure in its closed position, and when said receptacle is held in another position to hold said closure in its open position.

3. In a receptacle for refuse and the like adapted to be tilted to empty the same, the combination with a body portion, provided with a flat surface, of an inwardly opening closure pivotally secured to said body portion near said flat surface, and adapted when in its open position to rest against the inner side of said surface, said closure being provided with a counterweight rigidly secured thereto, said counterweight being adapted when said receptacle is held in one position to hold said closure in its closed position, and when said receptacle is held in another position to hold said closure in its open position.

4. In a receptacle for refuse and the like adapted to be tilted to empty the same, the combination with a body portion, provided with a flat surface, of an inwardly opening closure pivotally secured to said body portion near said flat surface, and adapted when in its open position to rest against the inner side of said surface, said closure being provided with a counterweight rigidly secured thereto, said counterweight being provided with a hanging weight and being adapted when said receptacle is held in one position to hold said closure in its closed position, and when said receptacle is held in another position to hold said closure in its open position.

5. In a receptacle for refuse and the like adapted to be tilted to empty the same, the combination with a body portion, of an inwardly opening closure pivotally secured to said body portion, and a counterweight rigidly secured to said closure, said counterweight being adapted when said receptacle is held in one position to hold said closure in its closed position and when said receptacle is held in another position and said counterweight moved forward to hold said closure in its open position.

6. In a receptacle for refuse and the like adapted to be tilted to empty the same, the combination with a body portion, of an inwardly opening closure pivotally secured to said body portion, and a counterweight rigidly secured to said closure, said counterweight being provided with a hanging weight and being adapted when said receptacle is held in one position to hold said closure in its closed position and when said receptacle is held in another position and said counterweight is moved forward to hold said closure in its open position.

7. In a receptacle for refuse and the like adapted to be tilted to empty the same, the combination with a body portion, provided with a flat surface, of an inwardly opening closure pivotally secured to said body portion near said flat surface, and adapted when in its open position to rest against the inner side of said surface, said closure being provided with a counterweight rigidly secured thereto.

8. In a receptacle for refuse and the like adapted to be tilted to empty the same, the combination with a body portion provided with a flat surface, of an inwardly opening closure pivotally secured to said body portion near said flat surface, and adapted when in its open position to rest against the inner side of said surface, said closure being provided with a counterweight rigidly secured thereto, and said counterweight handle being provided with a hanging weight.

9. In a receptacle for refuse and the like adapted to be tilted to empty the same, the combination with a body portion provided with a flat surface, of an inwardly opening closure pivotally secured to said body portion near said flat surface, and adapted when in its open position to rest against the inner side of said surface, said closure being provided with a counterweight rigidly secured thereto, said counterweight being adapted when said receptacle is held in one position to hold said closure in its closed position and when said receptacle is held in another position and said counterweight moved forward to hold said closure in its open position.

10. In a receptacle for refuse and the like adapted to be tilted to empty the same, the combination with a body portion provided with a flat surface, of an inwardly opening closure pivotally secured to said body portion near said flat surface, and adapted when in its open position to rest against the inner side of said surface, said closure being provided with a counterweight, said counterweight being provided with a hanging weight and being adapted when said receptacle is held in one position to hold said closure in its closed position and when said receptacle is held in another position and said counterweight moved forward to hold said closure in its open position.

In witness whereof I have hereunto signed my name this 11th day of November 1914, in the presence of two subscribing witnesses.

ALBERT EDWARDS.

Witnesses:
 LOUISE ENDERLE,
 EDMOND CONGAN BROWN.